United States Patent [19]

Hirakouchi et al.

[11] Patent Number: 5,288,813
[45] Date of Patent: Feb. 22, 1994

[54] VISCOELASTIC RESIN COMPOSITION OR VIBRATION DAMPING MATERIAL

[75] Inventors: Hiroshi Hirakouchi; Masanori Nakamura; Takeshi Yatsuka, all of Otsu; Nobuo Kadowaki, Futtsu; Hiroshi Endoh, Futtsu; Yoshimasa Zama, Futtsu, all of Japan

[73] Assignees: Toyo Boseki Kabushiki Kaisha, Osaka; Nippon Steel Corporation, Tokyo, both of Japan

[21] Appl. No.: 748,550

[22] Filed: Aug. 22, 1991

[30] Foreign Application Priority Data

Aug. 22, 1990 [JP] Japan .................. 2-221470

[51] Int. Cl.$^5$ .............................. C08F 20/00
[52] U.S. Cl. ................... 525/438; 525/440; 525/454
[58] Field of Search ............ 525/438, 440, 454

[56] References Cited

U.S. PATENT DOCUMENTS

| | | | |
|---|---|---|---|
| 4,131,633 | 12/1978 | Doorakian et al. | 525/530 |
| 4,141,865 | 2/1979 | Bogan | 525/533 |
| 4,370,465 | 1/1983 | Whiteside, Jr. et al. | 525/533 |
| 4,740,580 | 4/1988 | Merck et al. | 525/438 |
| 4,897,450 | 1/1990 | Craun et al. | 525/11.1 |
| 4,942,219 | 7/1990 | Yatsuka et al. | 525/438 |
| 4,981,926 | 1/1991 | Pham et al. | 525/533 |

FOREIGN PATENT DOCUMENTS 63-75056 4/1988 Japan .
0115374 6/1989 Japan .

OTHER PUBLICATIONS

Derwent Abstract, Abstract No. 88-130669(19) (May 4, 1988).
Derwent Abstract, Abstract No. 91-269749/37 (Nov. 13, 1991).
Derwent Abstract, Abstract No. 89-352242(48) (Oct. 19, 1989).
M. Yoshihara, Chemical Abstracts, 85(12): 79827m (Sep. 20, 1976).
N. Hata et al., Chemical Abstracts, 83(24): 195392y (Dec. 15, 1975).

*Primary Examiner*—Melvyn I. Marquis
*Assistant Examiner*—Randy Gulakowski
*Attorney, Agent, or Firm*—Wegner, Cantor, Mueller & Player

[57] ABSTRACT

There is disclosed a viscoelastic resin composition for vibration damping material containing as essential components a polyester resin having a molecular weight of 5,000 to 50,000 and an acid value of 50 to 500 equivalents/$10^6$ g, at least 80 mol % of the polycarboxylic acid component of which is an aromatic dicarboxylic acid and, at least 30 mol % of the polyol component of which is a compound of the formula (I):

$$H-(OR_2)_n-O-A-R_1-A-O-(R_2O)_n-H \qquad (I)$$

wherein $R_1$ is oxygen or a straight or branched chain $C_{1-6}$ alkylene group; $R_2$ is a straight or branched $C_{1-6}$ alkylene group; A is a group of the formula:

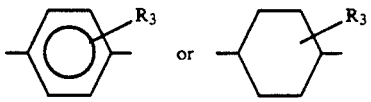

(wherein $R_3$ is hydrogen or a $C_{1-6}$ alkyl group); and n is an integer of 1 to 6, an acid anhydride compound having at least two acid anhydride groups in a molecule, and an epoxy compound having at least two epoxy groups in a molecule.

10 Claims, No Drawings

VISCOELASTIC RESIN COMPOSITION OR VIBRATION DAMPING MATERIAL

FIELD OF THE INVENTION

The present invention relates to a viscoelastic resin composition for a vibration damping material. More particularly, it relates to a viscoelastic resin composition for vibration damping material useful for a middle layer of a vibration damping material having a composite laminate structure which is used as a structural component of various structures such as machines, buildings, vehicles and the like, or a part thereof.

BACKGROUND OF THE INVENTION

Recently, noises and vibration problems have become an objective of public concern as an environmental pollution with development of transportation means and increase in residential areas which are located near factories and the like. Further, in a workshop, there is a tendency to limit noises and vibration to improve working atmosphere. To cope with this tendency, it is requested to impart vibration damping property to a metallic material, namely, to impart a function to a noise generating member itself so that the member can absorb its own vibrational energy and convert it into heat energy to attenuate frequency of vibration or vibrational amplitude, thereby noise is decreased. Further, it is requested to improve such a function.

Based on these requests, as one of vibration damping materials having desired properties, there has been proposed a vibration damping material having a composite laminate structure wherein a middle layer having viscoelasticity is sandwiched by metal layers. This type of a composite vibration damping material has been studied and employed as oil pans of automobiles, engine covers, chutes of hoppers, stopper of conveying apparatus, domestic electric equipments, vibration reducing members of other metal processing machines, structural members of precision machines in which prevention of vibration is desirable and the like.

In general, vibration damping property of such a composite vibration damping material depends upon the properties of a viscoelasticity layer which constitutes the middle layer thereof. When vibration damping property is expressed as a loss factor (which is a measure of conversion of an external vibration energy into a heat energy by internal friction, and corresponds to a value relating to mechanical hysteresis loss due to vibration), the property shows a peak at a certain temperature. It has been known that it is most effective to use a vibration damping material at about this temperature showing the peak property.

Hitherto, as a viscoelastic composition which constitutes the middle layer of such a composite vibration damping material, there have been known a simple polyester (Japanese Patent Kokai No. 50-143880) or a polyester to which a plasticizer is added (Japanese Patent Kokai No. 51-93770); a simple polyurethane foam (Japanese Patent Kokai No. 51-91981); a simple polyamide (Japanese Patent Kokai No. 56-159160); a simple ethylene-polyvinyl acetate copolymer (Japanese Patent Kokai No. 57-34949); a composition of a polyvinyl butyral or a polyvinyl butyral and a polyvinyl acetate to which a plasticizer and a tackifier are added (Japanese Patent Kokoku No. 55-27975); a copolymer of a isocyanate prepolymer and a vinyl monomer (Japanese Patent Kokoku No. 52-26554); copolymers disclosed in Japanese Patent Kokoku Nos. 39-12451 and 45-34703 and Japanese Patent Kokai No. 62-74645; and the like.

Further, in Japanese Patent Kokai No. 63-56522, there is disclosed an amorphous polyester showing excellent vibration damping property at 80° to 100° C. However, it is used in a thermoplastic state and, therefore, adhesion at a high temperature (80° to 100° C.) is insufficient and durability is also insufficient.

As the properties which are required for a composite vibration damping material, first of all, vibration damping property must be high. This is generally expressed by the magnitude of a loss factor. Secondly, a composite vibration damping material is also used as structural members and is subjected to processing such as press and the like and, therefore, it is also required that adhesive strength between a viscoelastic middle layer composed of a viscoelastic resin and a metal layer, particularly, adhesive strength under shear must be high. Thirdly, sometimes, a pressed composite vibration damping material is further subjected to a baking finish process and it is heated to about 200° C. and, therefore, it is also required that the viscoelastic middle layer does not run-off at about the above temperature. Fourthly, it is used as structural components of various structures such as machines and the like and, therefore, durability is also required.

A composite vibration damping material made of the above known viscoelastic composition has problem in any of these properties and is unsatisfactory.

Particularly, in a vibration damping material having a composite laminate structure, a temperature range showing a peak vibration damping property is at above a glass transition temperature of the viscoelastic middle layer resin. When a temperature rises to higher than the glass transition temperature, adhesion which remarkably influences on durability is rapidly lowered.

In general, it is difficult to obtain both satisfactory vibration damping property and durability in a composite laminate structure. Particularly, in the case of a material which is usually used in a high temperature range between 60° to 160° C. and, at the same time, vibration damping property is required at this temperature range, no material which satisfies both properties has not been found.

It has been known that an amorphous polyester resin is superior in vibration damping property (Japanese Patent Kokai Nos. 62-295949, 63-75056, 63-186757 and 63-56522). However, in the amorphous polyester resin, the above tendency is also remarkable. Particularly, when a temperature rises to higher than the glass transition temperature, durability is lowered due to decrease in adhesion, hydrolysis of the resin and the like.

In a crystalline polyester resin, durability at a temperature higher than the glass transition is insufficient and vibration damping property is inferior in comparison with the amorphous polyester resin.

Further, in order to improve durability, curing of the middle layer can be applicable. However, even if it is cured by using an isocyanate crosslinking agent which is normally used, sufficient durability can not be obtained. Further, even if an epoxy curing agent is used, a material which satisfies all of vibration damping property and adhesion at a high temperature range as well as durability can not be obtained.

As described above, no vibration damping material which satisfies various properties at a high temperature range and good durability has not been obtained according to a conventional technique.

OBJECTS OF THE INVENTION

The main object of the present invention is to provide a vibration damping resin having excellent durability, which satisfies both excellent vibration damping property and good adhesion to metallic materials when it is used as a viscoelastic middle layer of a composite vibration damping material. Particularly, the present invention provides a viscoelastic composition which can satisfy both two contradictory properties, that is, vibration damping property and adhesion at a high temperature range.

This object as well as other objects and advantages of the present invention will become apparent to those skilled in the art from the following description.

SUMMARY OF THE INVENTION

Under these circumstances, the present inventors have intensively studied a polyester resin and curing thereof. As a result, the present invention has been completed.

That is, according to the present invention, there is provided a viscoelastic resin composition for vibration damping material which comprises:

a polyester resin having a molecular weight of 5,000 to 50,000 and an acid value of 50 to 500 equivalents/$10^6$ g, at least 80 mol % of the polycarboxylic acid component of which is an aromatic dicarboxylic acid and, at least 30 mol % of the polyol component of which is a compound of the formula (I):

$$H-(OR_2)_n-O-A-R_1-A-O-(R_2O)_n-H \qquad (I)$$

wherein $R_1$ is oxygen or a straight or branched chain $C_{1-6}$ alkylene group; $R_2$ is a straight or branched $C_{1-6}$ alkylene group; A is a group of the formula:

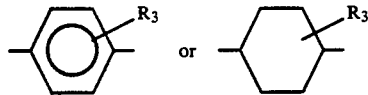

(wherein $R_3$ is hydrogen or a $C_{1-6}$ alkyl group); and n is an integer of 1 to 6, an acid anhydride compound having at least two acid anhydride groups in a molecule, and an epoxy compound having at least two epoxy groups in a molecule.

The present invention also provides a composite vibration damping steel plate comprising two metal plate layers and a layer of the viscoelastic resin of the present invention sandwiched between the metal layers.

DETAILED DESCRIPTION OF THE INVENTION

The polyester resin used in the present invention can be obtained by carrying out copolymerization according to a known ester interchange method or direct polymerization method and then reacting a polyvalent carboxylic acid or an acid anhydride thereof in a stream of nitrogen at a high temperature under a normal pressure.

The polyester resin thus obtained should have a molecular weight of 5,000 to 50,000, preferably, 7,000 to 30,000. When the molecular weight is lower than 5,000, vibration damping property is deteriorated and, when the molecular weight exceeds 50,000, reactivity with the acid anhydride compound and further with the epoxy compound is deteriorated.

In order to suitably promote the reaction of a polyester resin with an acid anhydride, it has been known to add caprolactone to the terminal end of a polyester (Japanese Patent Kokai No. 1-198622). However, in the present invention, the polyester resin having good vibration damping property and adhesion at a high temperature as well as a high glass transition temperature is required. Therefore, the use of a raw material which is liable to reduce a glass transition temperature, such as aliphatic caprolactone, is not effective. Further, no effect is obtained by using it in a small amount. Accordingly, it is required to employ another technique for facilitating the reaction of the polyester resin with the acid anhydride compound and further with the epoxy compound.

Then, the present inventors have intensively studied the reactivity. As a result, it has been found that it is effective to add carboxyl group at the terminal end of the molecular chain of a polyester resin. That is, it has been found that, in order to crosslink a polyester resin with an epoxy resin at a high temperature for a short period of time, it is preferred to add carboxyl group at the terminal end of the molecular chain of a polyester resin and further to use such a polyester resin in combination with an acid anhydride compound.

The acid value of the polyester resin used in the present invention is 50 to 500 equivalents/$10^6$ g. When the acid value is lower than 50 equivalents/$10^6$ g, the curing reaction does not proceed sufficiently. When the acid value exceeds 500 equivalents/$10^6$ g, it is difficult to obtain the desired polyester resin having a molecular weight of 5,000 to 50,000 and, further, there are disadvantages such that hydrolysis of the resin during storage is liable to be caused, and the like. The acid value is preferably 60 to 300 equivalents/$10^6$ g, more preferably 100 to 200 equivalents/$10^6$ g.

Hereinafter, the polyester resin composition of the present invention will be explained in detail.

At least 80 mol % of the polycarboxylic acid component of the polyester resin is an aromatic dicarboxylic acid. Examples of the aromatic dicarboxylic acid include terephthalic acid, isophthalic acid, phthalic acid, 2,6-naphthalene dicarboxylic acid, diphenyl dicarboxylic acid, dipheylmethane dicarboxylic acid, phenylindene dicarboxylic acid and the like. If necessary, dicarboxylic acids other than the aromatic dicarboxylic acid can be used in an amount of up to 20 mol %. Examples of such dicarboxylic acids include adipic acid, azelaic acid, sebacic acid, dodecane dicarboxylic acid, dimer acid, cyclohexane dicarboxylic acid and the like. Further, polyvalent carboxylic acids such as trimellitic acid anhydride and the like can also be used in so far as they do not deteriorate the property.

It is necessary to use the polyol represented by the above formula (I) in an amount of at least 30 mol % of the polyol component of the polyester resin. Examples of the polyol represented by the formula (I) include bis(4-hydroxyethoxyphenyl)methane, 2,2-bis(4-hydroxymethoxyphenyl)propane, 2,2-bis(4-hydroxyethoxyphenyl)propane, 2,2-bis[4-(2-hydroxypropoxy)phenyl]propane and the like. Further, if necessary, polyols other than the compound of the formula (I) can be used in an amount of up to 70 mol %. Examples of such polyols include ethylene glycol, neopentyl glycol, 1,4-butanediol, 1,5-pentanediol, 1,6-hexanediol, diethylene glycol, reductant of dimer acid, eicosanediol, 8,13-methyleicosanediol, 3-methylpentanediol, trimethylpentanediol and the like. further, cycloaliphatic polyols such as 1,4-cyclohexanedimethanol, 2,2-bis(4-hydroxycyclohexyl)propane and the like can be used.

As described above, it is preferred to add carboxyl group at the terminal end of the molecular chain of the polyester obtained by copolymerizing the above dicarboxylic acid with the polyol. For this purpose, a polyvalent carboxylic acid or an acid anhydride thereof is reacted with the polyester. Examples of the polyvalent carboxylic acid or its acid anhydride include terephthalic acid, isophthalic acid, trimellitic anhydride, pyromellitic anhydride and the like. There are many combinations of these monomers and they can be appropriately selected according to the desired glass transition temperature and the like. Further, the combination is not necessarily limited to that of single monomers and monomers can be used alone or in combination thereof. Further, two or more the polyester resins obtained by copolymerizing the above raw materials can also be used in combination.

An acid anhydride compound, an epoxy compound and, optionally, a trivalent phosphorous compound as a catalyst are used together with the above polyester resin. Examples of the acid anhydride compound include pyromellitic acid anhydride, cyclopentanetetracarboxylic acid dianhydride, benzophenonetetracarboxylic acid dianhydride and the like. These acid anhydrides can be used alone or in combination thereof.

Further, the epoxy compound should contain at least two epoxy groups in the molecule thereof and examples thereof include bisphenol A type epoxy resins (e.g., bisphenol A diglycidyl ether, its oligomers having a molecular weight of up to about 6,000, etc.), tetrabromobisphenol A type epoxy resins (e.g., tetrabromobisphenol A diglycidyl ether, its oligomers having a molecular weight of up to about 6,000, etc.), bisphenol F type epoxy resins (e.g., bisphenol F diglycidyl ether, its oligomers having a molecular weight of up to about 6,000, etc.), phenolic novolak epoxy resins (e.g., phenolic novolak diglycidyl ether, its oligomers having a molecular weight of up to about 6,000, etc.), brominated phenolic novolak epoxy resins (e.g., brominated phenolic novolak diglycidyl ether, its oligomers having a molecular weight of up to about 6,000, etc.), cresol novolak epoxy resins (e.g., cresol novolak diglycidyl ether, its oligomers having a molecular weight of up to about 6,000, etc.), polyfunctional glycidyl amine compounds such as tetraglycidylmetaxylylenediamine, tetraglycidyl 1,3-bisaminomethylcyclohexane, tetraglycidyldiamino-diphenylmethane, triglycidyl-p-aminophenol, triglycidyl-m-aminophenol, digrycidylaniline, diglycidylorthotoluidine and the like, polyfunctional glycidyl ether compounds such as 1,4-butanediol glycidyl ether, 1,6-hexanediol glycidyl ether, ethylene glycol glycidyl ether, glycerol polyglycidyl ether, sorbitol polyglycidyl ether and the like, and glycidyl ester compounds such as diglycidyl phthalate, diglycidyl hexahydrophthalate, polyglycidyl trimellitate and the like. These epoxy compounds can be used alone or in combination thereof.

Further, examples of the trivalent phosphorous compound include triphenylphosphine, tributylphosphine, tricyclohexylphosphine and the like. These trivalent phosphorous compounds can be used alone or in combination thereof.

The preferred polyol component of the above formula (I) is the compound wherein $R_1$ is $-CH_2-$ or $CH_3-C-CH_3$, $R_2$ is $-CH_2CH_2-$ and n is 1 or 2. The particularly preferred composition is that composed of terephthalic acid, isophthalic acid or trimellitic acid anhydride as the acid component and ethylene glycol or 2,2-bis(4-hydroxyethoxyphenyl)propane as the glycol component. The preferred example of the acid anhydride compound is benzophenonetetracarboxylic acid dianhydride and the preferred example of the epoxy compound is a bisphenol A type epoxy resin in combination with a phenolic novolak epoxy resin.

Although, as a ring opening catalyst of an epoxy, an amine compound, particularly, a tertiary amine compound is normally used, such a catalyst is not suitable for the present invention because catalytic activity is too high and it influences on durability at a high temperature. In the present invention, in view of both reactivity and durability, the trivalent phosphorous compound is preferred as a ring opening catalyst of the epoxy, particularly, triphenylphosphine is preferred.

The amount of the acid anhydride compound formulated in the viscoelastic resin composition for vibration damping material of the present invention is 0.1 to 10 parts by weight, preferably, 0.5 to 5 parts by weight per 100 parts by weight of the polyester resin.

In the composition of the present invention, the above acid anhydride compound, epoxy resin compound and trivalent phosphorous compound are formulated in combination with the polyester resin. Eventually, the polyester resin reacts with the acid anhydride compound and epoxy compound to crosslink each other, thereby, satisfactory vibration damping property and adhesion at the high temperature range as well as durability are obtained. Accordingly, in order to satisfies various properties, the molar ratio of the epoxy groups of the epoxy compound to the sum of the carboxyl groups at the terminal ends of the polyester resin and the acid anhydride groups of the acid anhydride compound [epoxy groups/(acid anhydride groups+carboxyl groups)] should be 1.0 or more, more preferably, 1.5 to 4.0.

Further, the trivalent phosphorous compound is used as the ring opening catalyst of the epoxy group in an amount of 0.1 to 5 parts by weight, more preferably 0.1 to 3 parts by weight per 100 parts by weight of the polyester resin. The suitable ratio of the acid anhydride compound and epoxy compound to the polyester resin varies depending upon a molecular weight and an acid value of the polyester resin as well as kinds of the acid anhydride compound and epoxy compound used in combination. The composition of the present invention is characterized in that the crosslinking reaction of the polyester resin with the acid anhydride compound and epoxy compound can proceed at a high temperature for a short period of time by using the polyester resin having carboxyl group at the terminal end thereof. In this regard, the desired reaction rate which is suitable for a production line can be easily obtained by changing the amount of the trivalent phosphorous compound used as the crosslinking reaction catalyst.

Further, conductivity can be provided by formulating a conductive solid material into the above composition as a filler to obtain a vibration damping material which can be subjected to spot welding. Examples of the conductive material used for this purpose include processed metallic materials metals such as powders, flakes, fibers, wires and the like of stainless steel, zinc, tin, copper, nickel and the like; glass flakes which is subjected to metal plating treatment; conductive carbon materials such as carbon black, graphite, carbon fiber and the like. These conductive materials can be used alone or in combination thereof. Further, if necessary, various other fillers, antioxidants and coupling agents can also be used.

A process for producing a composite vibration damping material using the viscoelastic composition of the present invention is not specifically limited and there can be employed, for example, a batch process using a cut plate, a continuous process using a coil and the like. Further, a process for forming a viscoelastic resin composition layer on a steel plate is not specifically limited, either and there can be employed, for example, a process comprising applying a resin solution on a steel plate, drying a solvent and press-bonding the plates with heating to laminate each other, a process comprising extruding or coating a melt of the viscoelastic resin composition on a steel plate, a process comprising forming a film and press-bonding with heating it between metal layers and the like.

The viscoelastic resin composition of the present invention satisfies both contradictory properties such as vibration damping property at a high temperature range and long-period durability at a high temperature state, which is difficult to obtain by a conventional composition. The reason why these properties are obtained in the present invention may be such that the polyester resin, acid anhydride compound and epoxy resin compound form a three-dimensional crosslinked structure to maintain the strength of the resin, while maintaining vibration damping property at a high temperature. Further, it is considered that, in the preferred embodiment, hydroxy terminal end group of the polyester resin is converted into carboxyl group by the acid anhydride and, therefore, adhesion with a metal interface becomes higher, which results in improved durability of adhesion.

In the viscoelastic resin composition of the present invention, various properties at a high temperature range which are difficult to maintain in a conventional simple polyester resin or a conventional composition of a polyester resin and a polyfunctional isocyanate crosslinking agent can be maintained by using the polyester resin in combination with the epoxy resin and the acid anhydride. That is, it is considered that adhesive strength, heat resistance and resistance to hydrolysis at a high temperature range are remarkably improved by using the polyester resin in combination with the epoxy resin and the acid anhydride.

The following Preparations, Examples and Comparative Examples further illustrate the present invention in detail but are not to be construed to limit the scope thereof. In the Preparations and Examples, all "parts" are by weight unless otherwise stated.

PREPARATIONS 1 TO 6

Synthesis of Polyester Resin

Dimethyl terephthalate (96 parts), dimethyl isophthalate (95 parts), trimellitic anhydride (2.9 parts), ethylene glycol (87 parts), 2,2-bis(4-hydroxyethoxyphenyl)propane (190 parts) and tetrabutyl titanate (0.07 part) were placed in a reactor equipped with a thermometer, a stirrer and a reflux condenser. Ester interchange reaction was carried out at 180° to 230° C. for 8 hours and then the pressure of the reaction system was reduced to 5 mmHg over 30 minutes. During this time, the temperature rose to 250° C. Further, polycondensation reaction was carried out under the pressure of 0.3 mmHg at 250° C. for 1 hour. Then, nitrogen gas was introduced into this reaction system and trimellitic anhydride (2.9 parts) was placed in the reactor. After the reaction system was thoroughly mixed, the system was heated at 220° C. for 30 minutes to obtain the desired polyester resin. The resulting polyester was a copolymer polyester resin having the molecular weight of 18,000 and the acid value of 111 equivalents/$10^6$ g.

According to the same manner, the polyester resins as shown in Table 1 were obtained.

TABLE 1

|  | Preparation No. | | | | | |
| --- | --- | --- | --- | --- | --- | --- |
|  | 1 | 2 | 3 | 4 | 5 | 6 |
| Acid component (molar ratio) | | | | | | |
| Terephthalic acid | 49 | 50 | — | — | 49 | 49 |
| Isophthalic acid | 49.5 | 50 | 49 | 34 | 49 | 49 |
| Orthophthalic acid | — | — | 48 | — | — | — |
| 2,6-Naphthalenedicarboxylic acid | — | — | — | 65 | — | — |
| Trimellitic anhydride | 1.5 | — | 3 | 1 | 2 | 1 |
| Glycol component (molar ratio) | | | | | | |
| Ethylene glycol | 50 | 50 | 50 | 50 | 30 | 30 |
| 2,2-Bis(4-hydroxyethoxyphenyl)propane | 50 | 50 | 50 | 50 | 70 | 70 |
| Trimellitic anhydride of the terminal reaction | 1.5 | 2 | 1 | 1.5 | 2 | 4 |
| Molecular weight | 18000 | 11000 | 21000 | 12000 | 13000 | 8000 |
| Acid value (eq./$10^6$ g) | 111 | 128 | 62 | 100 | 135 | 237 |

REFERENCE PREPARATIONS 1 TO 8

Polyester resins of Comparative Preparations 1 to 8 as shown in Table 2 were obtained as follows:

In Reference Preparations 1 to 5, according to the same manner as that described in Preparation 1, polyester resins were obtained.

In Reference Preparation 6, according to the same manner as that described in Preparation 1, polycondensation reaction was carried out except that carboxyl group was not added to the terminal.

In Reference Preparations 7 and 8, according to the same manner as that described in Reference Preparation 6, polycondensation reaction was carried out. Then, nitrogen gas was introduced into the reaction system and ε-caprolactone was placed in the reactor. After the reaction system was thoroughly mixed, the system was heated to 200° to 210° C. for 1 hour to carry out addition reaction.

TABLE 2

| | Comp. Preparation No. | | | | | | | |
|---|---|---|---|---|---|---|---|---|
| | 1 | 2 | 3 | 4 | 5 | 6 | 7 | 8 |
| Acid component (molar ratio) | | | | | | | | |
| Terephthalic acid | 49 | 49 | 49 | 34 | 34 | 49 | 49 | 49 |
| Isophthalic acid | 49 | 49 | 49 | 34 | 34 | 49 | 49 | 49 |
| Cyclohexanedi-carboxylic acid | — | — | — | — | 30 | — | — | — |
| Adipic acid | — | — | — | 30 | — | — | — | — |
| Trimellitic anhydride | 2 | 2 | 2 | 2 | 2 | 2 | 2 | 2 |
| Glycol component (molar ratio) | | | | | | | | |
| Ethylene glycol | 50 | 30 | 80 | 30 | 50 | 50 | 20 | 20 |
| 2,2-Bis(4-hydroxy-ethoxyphenyl)propane | 50 | 70 | 20 | 70 | 50 | 50 | 80 | 80 |
| Amount of ε-caprolactone added at the terminal end | — | — | — | — | — | — | 50 | 120 |
| Amount of trimellitic acid anhydride added at the terminal end | 0.5 | 10 | 2 | 2 | 2 | — | — | — |
| Molecular weight | 21000 | 4000 | 18000 | 15000 | 12000 | 23000 | 15000 | 22000 |
| Acid value (eq./$10^6$ g) | 31 | 670 | 115 | 121 | 135 | 5 | 8 | 17 |

EXAMPLE 1

The polyester obtained in Preparation 1 (100 parts), epoxy resin (YD-017 manufactured by Toto Kasei Kabushiki Kaisha, 20 parts), YDCN-703 (5 parts), benzophenonetetracarboxylic acid dianhydride (3 parts) and hindered phenol antioxidant (Irganox-1010 manufactured by Ciba-Geigy A.G., 0.3 part) were dissolved in a mixed solvent of cyclohexanone/xylene (1:1). Then, the solution was cooled to room temperature and triphenylphosphine (0.6 part) was added thereto as a ring opening catalyst of the epoxy compound. This solution was coated on each surface of two chromated steel plates each having 0.8 mm in thickness so that the coating thickness after drying with hot air at 180° C. for 90 seconds became 25 μm. Then, the coated surfaces were laid on each other and press-bonded at 220° C. for 30 seconds under pressure of 20 kg/cm².

The laminate thus obtained was evaluated according to the following manner.

(1) Adhesion

Shear adhesion of a sample (25 mm × 10 mm) of the laminate was measured at an elongation rate of 50 mm/min. and at 20° C. and 100° C. This measurement at 100° C. was carried out by imaging the use at a high temperature range.

(2) Vibration damping property

The damping factor (η) of a sample (30 mm × 300 mm) of the composite steel plate with vibration of 500 Hz at various temperatures was measured according to mechanical impedance method. A sample having a larger η shows more superior vibration damping property.

(3) Durability

The composite steel plate was heat-treated at 200° C. for 30 minutes and allowed to stand in saturated water vapor at 121° C. for 48 hours. Shear adhesion of a sample (25 mm × 10 mm) of the laminate after standing was measured at an elongation rate of 50 mm/min and a temperature of 20° C.

(4) Gel fraction

The resin solution was coated on a surface of a polyethylene terephthalate film so that the coating thickness after drying with hot air at 180° C. for 3 minutes became 20 μm. Then, the coated film was dipped in a solution of methyl ethyl ketone/toluene (1:1) at room temperature for 1 hour and the weight ratio of the indissoluble part was measured. This evaluation was carried out by imaging curing property which remarkably influenced on adhesion at a high temperature region and durability.

The results are shown in Table 3.

EXAMPLES 2 TO 7 AND COMPARATIVE EXAMPLES 1 TO 11

According to the same manner as that described in Example 1, a composite laminated steel plate was obtained by using the resins and additives as shown in Table 3 and Table 4. The laminated plate thus obtained was evaluated according to the same manner as that described in Example 1.

The results are shown in Table 3 and Table 4.

In Comparative Example 1, no acid anhydride compound is used and, in Comparative Example 2, no trivalent phosphorous compound is used. In Example 7, an amine epoxy ring opening catalyst is used. In Comparative Examples 3, 4 and 8, the acid values are out of the range between 50 and 500 equivalent. In Comparative Example 5, the amount of the aromatic compound having two hydroxyalkyl groups or hydroxyalkoxy groups as the polyol component is less than 30 mol %. In Comparative Examples 6 and 7, the amount of the aromatic dicarboxylic acid is less than 80 mol %. In Comparative Example 9, no carboxyl group is added at the terminal end of the polyester resin. In Comparative Examples 10 and 11, ε-caprolactone was added at the terminal end of the polyester resin.

TABLE 3

| Bonding adhesive | Example No. | | | | | |
|---|---|---|---|---|---|---|
| (parts) | 1 | 2 | 3 | 4 | 5 | 6 |
| Polyester of Prep. 1 | 100 | — | — | — | — | — |
| Polyester of Prep. 2 | — | 100 | — | — | — | — |
| Polyester of Prep. 3 | — | — | 100 | — | — | — |
| Polyester of Prep. 4 | — | — | — | 100 | — | — |
| Polyester of Prep. 5 | — | — | — | — | 100 | — |

TABLE 3-continued

| Bonding adhesive | Example No. | | | | | |
|---|---|---|---|---|---|---|
| (parts) | 1 | 2 | 3 | 4 | 5 | 6 |
| Polyester of Prep. 6 | — | — | — | — | — | 100 |
| YD-017 | 20 | 20 | 20 | 30 | 50 | 30 |
| YDCN-703 | 5 | 5 | 5 | 5 | 10 | 5 |
| Benzophenonetetracarboxylic acid dianhydride | 1 | 1 | — | 1 | 4 | 1 |
| Pyromellitic anhydride | — | — | 1 | — | — | — |
| Irganox-1010 | 0.3 | 0.3 | 0.3 | 0.3 | 0.3 | 0.3 |
| Triphenylphosphine | 0.6 | 0.6 | 0.6 | 0.6 | 0.6 | 0.6 |
| Shear adhesion strength (kg/cm$^2$) | | | | | | |
| measured at 20° C. | 190 | 210 | 230 | 205 | 214 | 243 |
| measured at 100° C. | 104 | 80 | 62 | 78 | 106 | 110 |
| Vibration damping property ($\eta$) | | | | | | |
| 100° C. | 0.32 | 0.30 | 0.27 | 0.21 | 0.23 | 0.25 |
| 120° C. | 0.21 | 0.18 | 0.22 | 0.32 | 0.24 | 0.23 |
| 150° C. | 0.15 | 0.12 | 0.16 | 0.18 | 0.12 | 0.13 |
| Curing property | | | | | | |
| Gel fraction (%) after drying at 180° C. for 3 min. | 81 | 71 | 58 | 76 | 88 | 85 |
| Durability | | | | | | |
| Shear adhesion strength (kg/cm$^2$) after standing in saturated water vapor at 121° C. for 48 hr | 175 | 177 | 143 | 182 | 190 | 185 |

TABLE 4

| Bonding adhesive | Comparative Example | | | | | | | | | | | Example |
|---|---|---|---|---|---|---|---|---|---|---|---|---|
| (parts) | 1 | 2 | 3 | 4 | 5 | 6 | 7 | 8 | 9 | 10 | 11 | 7 |
| Polyester of Prep. 1 | 100 | 100 | — | — | — | — | — | — | — | — | — | 100 |
| Polyester of Ref. Prep. 1 | — | — | 100 | — | — | — | — | — | — | — | — | — |
| Polyester of Ref. Prep. 2 | — | — | — | 100 | — | — | — | — | — | — | — | — |
| Polyester of Ref. Prep. 3 | — | — | — | — | 100 | — | — | — | — | — | — | — |
| Polyester of Ref. Prep. 4 | — | — | — | — | — | 100 | — | — | — | — | — | — |
| Polyester of Ref. Prep. 5 | — | — | — | — | — | — | 100 | — | — | — | — | — |
| Polyester of Ref. Prep. 6 | — | — | — | — | — | — | — | 100 | 100 | — | — | — |
| Polyester of Ref. Prep. 7 | — | — | — | — | — | — | — | — | — | 100 | — | — |
| Polyester of Ref. Prep. 8 | — | — | — | — | — | — | — | — | — | — | 100 | — |
| YD-017 | 20 | 20 | 20 | 20 | 20 | 30 | 20 | 20 | 30 | 30 | 30 | 20 |
| YDCN-703 | 5 | 5 | 5 | 5 | 5 | 5 | 5 | 5 | 10 | 10 | 10 | 5 |
| Benzophenonetetra-carboxylic acid dianhydride | — | 1 | 1 | 1 | 1 | 1 | 1 | 1 | 5 | 5 | 5 | 1 |
| Irganox-1010 | 0.3 | 0.3 | 0.3 | 0.3 | 0.3 | 0.3 | 0.3 | 0.3 | 0.3 | 0.3 | 0.3 | 0.3 |
| Benzyldimethylamine | — | — | — | — | — | — | — | — | — | — | — | 0.6 |
| triphenylphosphine | 0.6 | — | 0.6 | 0.6 | 0.6 | 0.6 | 0.6 | 0.6 | 0.6 | 0.6 | 0.6 | — |
| Shear adhesion strength (kg/cm$^2$) | | | | | | | | | | | | |
| measured at 20° C. | 170 | 180 | 190 | 144 | 215 | 210 | 180 | 197 | 222 | 185 | 175 | 210 |
| measured at 100° C. | 0 | 0 | 15 | 0 | 55 | 47 | 38 | 0 | 0 | 15 | 75 | 60 |
| Vibration damping property ($\eta$) | | | | | | | | | | | | |
| 100° C. | 0.35 | 0.32 | 0.35 | 0.30 | 0.15 | 0.11 | 0.21 | 0.37 | 0.31 | 0.21 | 0.12 | 0.30 |
| 120° C. | 0.18 | 0.15 | 0.15 | 0.12 | 0.06 | 0.07 | 0.09 | 0.09 | 0.16 | 0.10 | 0.07 | 0.22 |
| 150° C. | 0.06 | 0.07 | 0.07 | 0.08 | 0.04 | 0.05 | 0.08 | 0.07 | 0.08 | 0.07 | 0.07 | 0.12 |
| Curing property | | | | | | | | | | | | |
| Gel fraction (%) after drying at 180° C. for 3 min. | 0 | 0 | 25 | 0 | 65 | 47 | 55 | 0 | 12 | 24 | 78 | 82 |
| Durability | | | | | | | | | | | | |
| Shear adhesion strength (kg/cm$^2$) after standing in saturated water vapor at 121° C. for 48 hr | 0 | 0 | 45 | 0 | 72 | 35 | 42 | 0 | 0 | 0 | 85 | 65 |

As is apparent from Examples and Comparative Examples, adhesion at a high temperature region as well as heat resistance and durability can be remarkably improved by using the polyester resin of a specific structure having carboxyl group at the terminal end as the viscoelastic resin composition for composite vibration damping material. In the composition of the present invention, the crosslinking reaction proceeds at a high temperature for a short period of time and, therefore, sufficient properties can be obtained by heating for a short period of time. Accordingly, the resin of the present invention is very useful as a viscoelastic resin composition for a composite vibration damping material.

What is claimed is:

1. A viscoelastic resin composition useful for vibration damping material which comprises:
   (a) a polyester resin having a molecular weight of 5,000 to 50,000, an acid value of 50 to 500 equivalents/10$^6$ g, a polycarboxylic acid component, at least 80 mol % of which is an aromatic dicarboxylic acid, and a polyol component, at least 30 mol % of which is a compound of the formula (I):

$$H-(OR_2)_n-O-A-R_1-A-O-(R_2O)_n-H \quad (I)$$

wherein $R_1$ is oxygen or a straight or branched chain $C_{1-6}$ alkylene group; $R_2$ is a straight or branched chain $C_{1-6}$ alkylene group; A is a group of the formula:

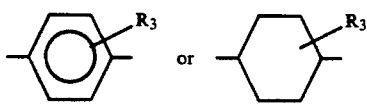

wherein $R_3$ is hydrogen or a $C_{1-6}$ alkyl group; and n is an integer of 1 to 6, and at most 70 mol % of the polyol component of which is at least one polyol selected from the group consisting of ethylene glycol, neopentyl glycol, 1,4-butanediol, 1,5-pentanediol, 1,6-hexanediol, diethylene glycol, reductant of dimer acid, eicosanediol, 8,13-methyleicosanediol, 3-methylpentanediol, trimethylpentanediol and cycloaliphatic polyols, (b) an acid anhydride compound having at least two acid anhydride groups in a molecule, (c) an epoxy compound having at least two epoxy groups in a molecule, and (d) a ring-opening catalyst of the epoxy group, said composition having a gel fraction of at least 50% by weight when in the form of a coating having a thickness of not more than 100 μm after drying at 180° C. for 3 minutes.

2. A composition according to claim 1, wherein the acid value of the polyester resin is 60 to 300 equivalents/$10^6$ g.

3. A composition according to claim 1, wherein the molecular weight of the polyester resin is 7,000 to 30,000.

4. A composition according to claim 1, wherein the ratio of the formula:

$$(c)/[(a)+(b)]$$

wherein (a) is the amount of carboxyl group (equivalents) at the terminal end of the polyester resin, (b) is the amount of an acid anhydride group of the acid anhydride compound (equivalents) and (c) is the amount of an epoxy group of the epoxy compound (equivalents), is not less than 1.0.

5. A composition according to claim 4, wherein the ring opening catalyst of the epoxy group is a trivalent phosphorous compound.

6. A composition according to claim 4, wherein the epoxy compound is a bisphenol A type epoxy resin and a phenolic novolak epoxy resin.

7. A composition according to claim 4, wherein the acid anhydride compound is at least one compound selected from the group consisting of trimellitic acid anhydride, pyromellitic acid anhydride, benzophenonetetracarboxylic acid dianhydride and cyclopentanetetracarboxylic acid dianhydride.

8. A composition according to claim 4, wherein the acid component of the polyester resin contains terephthalic acid, isophthalic acid and trimellitic anhydride and the glycol component contains ethylene glycol and 2,2-bis(4-hydroxyethoxyphenyl)propane.

9. A composition according to claim 4, wherein both terminal ends of the polyester resin are carboxyl groups and at least one of the carboxyl groups is introduced by the reaction of a polyvalent carboxylic acid or an acid anhydride thereof.

10. A composition according to claim 4, wherein the composition contains antioxidant.

* * * * *